UNITED STATES PATENT OFFICE.

CHARLES G. FERRARI, OF PHILADELPHIA, PENNSYLVANIA.

PRESERVATIVE WATERPROOF AND MOLDPROOF COMPOUND FOR WRAPPED FOOD PRODUCTS AND METHOD OF PRODUCING THE SAME.

1,407,400.            Specification of Letters Patent.    Patented Feb. 21, 1922.

No Drawing.            Application filed April 13, 1921. Serial No. 461,046.

*To all whom it may concern:*

Be it known that I, CHARLES G. FERRARI, a citizen of the United States, residing at the city of Philadelphia, in the county of Philadelphia and State of Pennsylvania, have invented certain new and useful Improvements in Preservative Waterproof and Moldproof Compounds for Wrapped Food Products and Methods of Producing the Same, of which the following is a specification.

My invention has for its object the provision as an article of manufacture, of elastic or yielding preservative mixtures so compounded as to become homogeneous and for applying to foil wrapped food products, as cheeses, as well as yeast and other similar products, to prevent growth of aerobic molds, the absorption by the wrapped products of undesirable odors, as well as for rendering proof of such food packages against moisture or air.

Hitherto it was the general custom to put up cheese, such as the cream, ancre, Neufchâtel, as well as other brands or types, in a foil wrapper, but by sudden changes of temperature or climatic conditions the aerobic molds formed quickly and not only deteriorated the products, but transformed them into a condition rendering such unsafe for use. This has particularly happened in summer weather. In the past in some cases paraffin-wax was employed around the wrapped products, but this has not been an assured success, because not pliable or elastic in application, for it is found when becoming hard the wrapped products cracked so that there was created rapid deterioration as well as undesirable odors and growth of aerobic molds rendering such products highly unsafe for use. Such products so wrapped and treated it was found keep but a short time and hence heavy losses in the past have been sustained.

To overcome the foregoing objectionable, as well as serious features, and to preserve food products of a character, readily spoiling by exposure, thus rendering unfit for use, is the purpose of my present invention.

My invention will be better understood as to the character thereof from the following description of the same.

The compounding of the mixture in one form which has been found for some time past highly efficient, is as follows:—

| | |
|---|---|
| Mineral oil | 3.5% |
| Paraffin-wax | 87.5% |
| Beeswax | 5.0% |
| Paracoumarone resin | 4.0% |
| | 100% |

The mineral oil is technically liquid petrolatum and is known under the appellation of petrolatum liquidum, liquid paraffin and mineral oil. It is a mixture of liquid hydrocarbons obtained chiefly from petroleum, a colorless, transparent, oily liquid free or nearly so from fluorescence, odorless, as well as tasteless when cold. Its specific gravity varies between 0.828–0.905 at 25° centigrade. The preferred oil to be used has a specific gravity of approximately 0.86.

The paraffin-wax used is a purified mixture of solid hydrocarbons usually obtained from petroleum, is colorless, and is more or less translucent and odorless, as well as tasteless. It is slightly greasy to the touch. The paraffin preparation has a melting point at about 52° centigrade.

The beeswax is the pure yellow beeswax containing no impurities, such as added paraffin-wax.

The paracoumarone resin used is a synthetic compound having an approximate melting point of 90° to 100° centigrade. Physically it is brittle, amorphous, resembles rosin somewhat and is a dark reddish brown. The source is from the polymerization of aromatic naphthas and technically it consists essentially of a mixture of polymerization products of coumarone, indene and their homologs. Practice has demonstrated that its use is preferable to ordinary rosin or colophony, because it contains essentially no material which is volatilized during the heating of the wax mixture and also because of its remarkable chemical inertness. Ordinary rosin partly decomposes, yielding volatile products and leaving a gummy resinous residue in the bottom of the mixture which is annoying because of its adherence to the sides and bottom of the container and because the initial properties of the mixture are thus disturbed.

The employment in the preservative compounded mixture of the mineral oil is to give a soft coat-like mixture and one highly pliable. The beeswax aids in a similar manner and in addition imparts to the compounded mixture a certain toughness which is decidedly advantageous to the same. The resin serves to make the wax-like mixture adhere firmly to the wrapped cheese, food, yeast or other similar products, and likewise to strengthen the same so contained for preservation, shipment or handling in a sanitary or hygienic manner.

The foregoing described ingredients entering into the composition of the compounded mixture of my said invention it has been found by extended practice to give most desirable results by mixing in any well known type of steam jacketed kettle in which they respectively, melt and form a homogeneous mixture at about 100° centigrade. The extreme temperature for coating the foil wrapped product, such as cheese or yeast, is between 110° and 120° centigrade. Within range of the recited temperatures the wrapped products will have a thin coating provided them, in a very pliable condition. Physically when cold or more or less set, it is of a light amber color and has a melting point at about 52.5° centigrade. The mixture in its liquefied condition is of a dark brown color.

It has been found that the hereinbefore described compounded preservative mixture for the purposes defined possesses the following decidedly advantageous features.

First. It is very pliable in application to packaged food products, permitting of very considerable bending, without cracking, as well as clinging or adhering to the foil or other type wrapper to which applied. Moreover, it enters the pores of the wrapper, thus sealing the product completely, as practice has demonstrated, to the surrounding air. By the exclusion of the air is absolutely prevented growth of aerobic molds, particularly on soft cheese, cream cheese, Neufchâtel cheese and ancre cheese, thus making it possible to keep the same from molding for periods of months, maintained at ordinary temperatures or under refrigerating conditions. The use of the compound does not so completely close the package as to make tearing of the foil difficult to open the package at the seams.

Second. This compounded preparation is transparent, thus allowing the label to be clearly observed. The coating is also waterproof.

Third. If stored in a damp place, it is equally efficient in preventing encroachment of molds to the cheese from outside sources, as well as preventing absorption of undesirable odors.

Fourth. It is found it will prevent the growth of aerobic molds on any food products in wrapped form. Moreover, if accidentally ingested, it does not harm the human system. It dries with greater eagerness than ordinary waxes, particularly in a current of air. Again it does not stick tenaciously to other objects, when partially cool, if placed against them.

Fifth. It will not prevent changes in any food product due to the bacterial activity of facultative aerobes or anaerobes.

From the foregoing it will be understood that the hereinbefore recited exact percentages of ingredients employed in the compounding of the said preservative mixture may be subject to variations from those given and still be effective for required results. Also, if one or more of the ingredients is or are used with properties different from those described by the foregoing formula, the proportions may be varied. In a similar manner the ingredients are capable of substitution by other similar elements, as a different resin or wax, and a preservative mixture similar in physical properties to the original formula as hereinabove given and equally efficient results be obtained.

Having thus described the nature and objects of my invention, what I claim as new and desire to secure by Letters Patent is:—

1. As an article of manufacture, a preservative waterproof and mold proof compounded mixture composed of mineral oil, paraffin-wax, beeswax and resin in proportions substantially as described and for the purposes set forth.

2. As an article of manufacture, a preservative waterproof and moldproof compounded mixture, composed of mineral oil, paraffin-wax, beeswax and paracoumarone resin compounded under heat in proportions substantially as hereinbefore described and for the purposes set forth.

3. As an article of manufacture, a preservative waterproof and moldproof compounded mixture, composed of mineral oil, paraffin-wax, beeswax and paracoumarone resin compounded and combined under steam heat in proportions substantially as hereinbefore described to provide a homogeneous waterproof and moldproof mixture, as and for the purposes set forth.

4. The method of producing a preservative waterproof and moldproof compounded mixture which consists in treating under heat mineral oil, paraffin wax, beeswax and resin in respective proportions substantially as set forth to thereby transform into a homogeneous waterproof and moldproof mixture and then applying at a temperature above that at which compounding of the mixture was effected, substantially as and for the purposes set forth.

5. The method of producing a preservative waterproof and moldproof compounded mixture which consists of treating mineral oil, paraffin wax, beeswax and paracoumarone resin in respective proportions substantially as set forth and under steam heat at about 100° centigrade to thereby transform into a substantially homogeneous mixture and then applying at a temperature ranging between 110° and 120° centigrade in the coating of a wrapped food article to be sealed to air as well as the growth of aerobic molds, substantially as set forth.

In witness whereof, I have hereunto set my signature in the presence of two subscribing witnesses.

CHARLES G. FERRARI.

Witnesses:
J. WALTER DOUGLASS,
ROSE E. McCARTHY.